US012631537B2

(12) United States Patent　　　　(10) Patent No.: US 12,631,537 B2
Rieder　　　　　　　　　　　　　　　(45) Date of Patent: May 19, 2026

(54) METHOD AND MEASURING DEVICE FOR DETERMINING A VISCOSITY MEASUREMENT VALUE, AS WELL AS A METHOD AND MEASURING ARRANGEMENT FOR DETERMINING A VOLUMETRIC FLOW MEASUREMENT VALUE

(71) Applicant: Endress+Hauser Flowtec AG, Reinach (CH)

(72) Inventor: Alfred Rieder, Landshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 404 days.

(21) Appl. No.: 18/254,469

(22) PCT Filed: Oct. 28, 2021

(86) PCT No.: PCT/EP2021/080029
　　§ 371 (c)(1),
　　(2) Date: May 25, 2023

(87) PCT Pub. No.: WO2022/111944
　　PCT Pub. Date: Jun. 2, 2022

(65) Prior Publication Data
　　US 2024/0011882 A1　　Jan. 11, 2024

(30) Foreign Application Priority Data

Nov. 27, 2020　(DE) ..................... 10 2020 131 459.0

(51) Int. Cl.
　　*G01N 11/16*　　　(2006.01)
　　*G01F 1/84*　　　(2006.01)
　　(Continued)

(52) U.S. Cl.
　　CPC ........... *G01N 11/16* (2013.01); *G01F 1/8422* (2013.01); *G01F 1/8431* (2013.01); (Continued)

(58) Field of Classification Search
　　CPC .... G01N 11/16; G01N 9/32; G01N 2009/006; G01F 1/8422; G01F 1/8431; G01F 1/8436
　　(Continued)

(56) References Cited

U.S. PATENT DOCUMENTS 4,470,294 A * 9/1984 Hamel .................. G01F 1/8422
　　　　　　　　　　　　　　　　　73/861.357
2005/0229719 A1* 10/2005 Rieder .................... G01F 15/00
　　　　　　　　　　　　　　　　　73/861.357

FOREIGN PATENT DOCUMENTS

AT　　　　508675 B1　　3/2011
AT　　　　515552 A4　　10/2015
　　　　　(Continued)

*Primary Examiner* — Peter J Macchiarolo
*Assistant Examiner* — Rodney T Frank
(74) *Attorney, Agent, or Firm* — Kelly J. Smith; Endress+Hauser (USA) Holding, Inc.

(57) ABSTRACT

A method for determining a viscosity measurement value of a medium conducted within an oscillatory measuring tube includes exciting at least one oscillation mode of the measuring tube; determining a natural frequency of the oscillation mode; determining the density of the medium; determining the damping of the oscillation mode; and determining the viscosity measurement value depending on the density, the natural frequency, and the damping of the oscillation mode, wherein the viscosity measurement value is determined, depending on a specification of the type of medium, with a model corresponding to the specification.

15 Claims, 3 Drawing Sheets

(51) Int. Cl.
   *G01F 15/02*      (2006.01)
   *G01N 9/32*      (2006.01)
   *G01N 9/00*      (2006.01)

(52) U.S. Cl.
   CPC .......... *G01F 1/8436* (2013.01); *G01F 15/024*
        (2013.01); *G01N 9/32* (2013.01); *G01N*
                *2009/006* (2013.01)

(58) Field of Classification Search
   USPC ....................................................... 73/54.26
   See application file for complete search history.

(56)            References Cited

FOREIGN PATENT DOCUMENTS

| | | | |
|---|---|---|---|
| DE | 255791 | A1 | 4/1988 |
| DE | 102004014029 | A1 | 10/2005 |
| DE | 102019123368 | A1 | 3/2021 |
| WO | 2005095901 | A2 | 10/2005 |
| WO | 2018208301 | A1 | 11/2018 |
| WO | 2020108910 | A1 | 6/2020 |

* cited by examiner

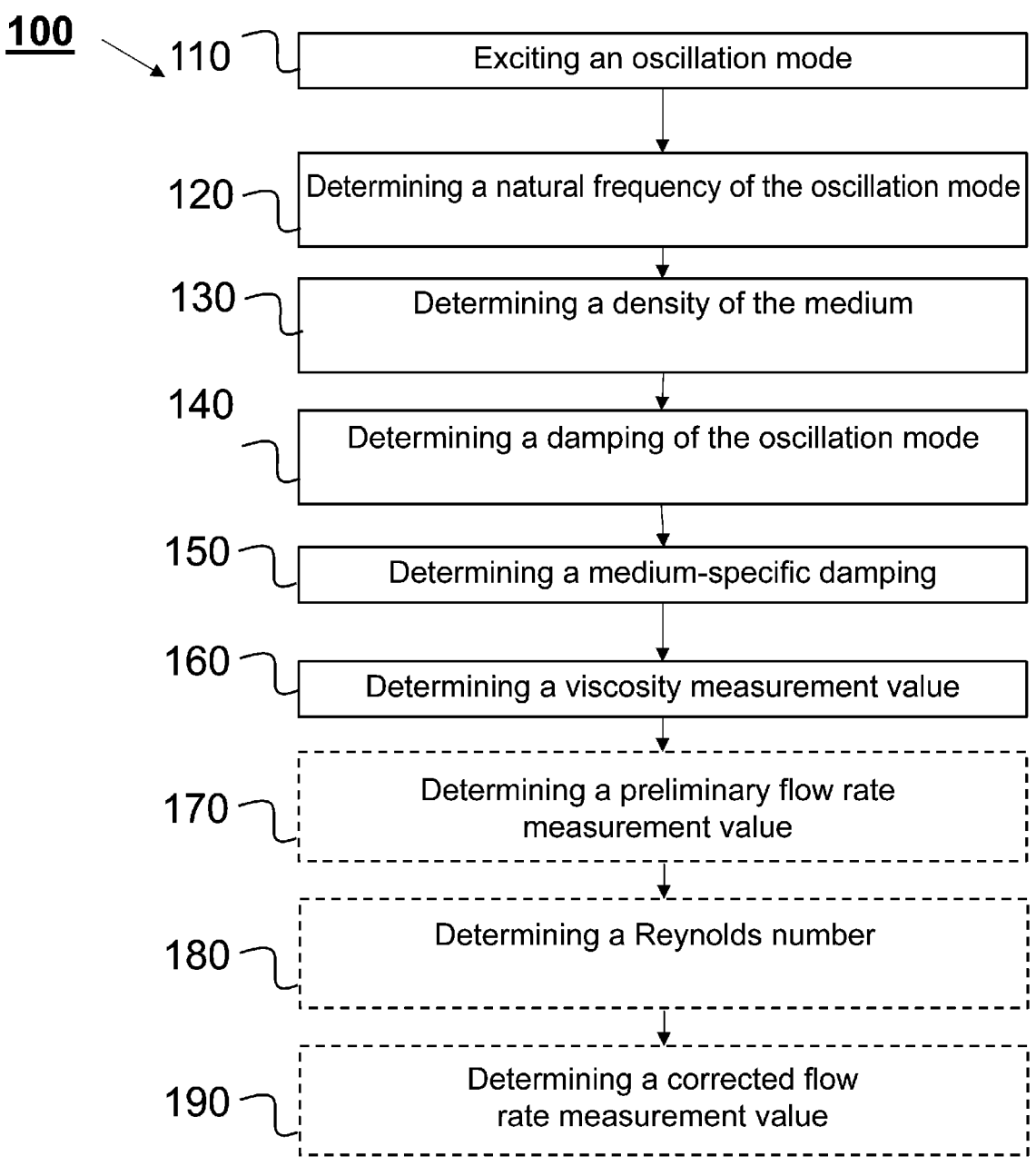

100

110  Exciting an oscillation mode

120  Determining a natural frequency of the oscillation mode

130  Determining a density of the medium

140  Determining a damping of the oscillation mode

150  Determining a medium-specific damping

160  Determining a viscosity measurement value

170  Determining a preliminary flow rate measurement value

180  Determining a Reynolds number

190  Determining a corrected flow rate measurement value

Fig. 2

METHOD AND MEASURING DEVICE FOR DETERMINING A VISCOSITY MEASUREMENT VALUE, AS WELL AS A METHOD AND MEASURING ARRANGEMENT FOR DETERMINING A VOLUMETRIC FLOW MEASUREMENT VALUE

CROSS-REFERENCE TO RELATED APPLICATIONS

The present application is related to and claims the priority benefit of DPMA Patent Application No. 10 2020 131 459.0, filed on Nov. 27, 2020 and International Patent Application No. PCT/EP2021/080029, filed on Oct. 28, 2021, the entire contents of which are incorporated herein by reference.

TECHNICAL FIELD

The present invention relates to a method and a measuring device for determining a viscosity measurement value, and to a method and a measuring arrangement for determining a volumetric flow measurement value.

BACKGROUND

In principle, it is known to determine the viscosity of a medium conducted in an oscillatory measuring tube using the damping of the measuring tube oscillations, for example using the ratio of excitation current and oscillation amplitude achieved therewith at the resonant frequency of an oscillation mode excited with the exciter. The medium-specific portion of the damping is then to be identified in order to determine the viscosity on the basis thereof. The viscosity measurement by means of the oscillation damping of measuring tubes is described in U.S. Pat. No. 7,059,176 B2, DE 100 20 606 A1, and DE 10 2017 116 515 A1. In the event of viscosities of more than 100 cP, the outlined procedure leads to satisfactory results. At lower viscosities, however, significant deviations of the measurement values determined in this way from reference values for the viscosity of the medium are observed. This is also unsatisfactory insofar as that the viscosity measurement values are used for the Reynolds number correction in the volumetric flow measurement, and it would be advantageous to determine still-valid viscosity measurement values using the oscillation damping of a measuring tube which serves in particular also for volumetric flow measurement values, even for viscosities below 100 cP, in particular below 10 cP, which viscosity measurement values enable an exact Reynolds number correction. The object of the present invention is to achieve a remedy here.

SUMMARY

The method according to the invention for determining a viscosity measurement value of a medium conducted in an oscillatory measuring tube comprises: Exciting at least one oscillation mode of the measuring tube; determining a natural frequency of the oscillation motion; determining the density of the medium; determining the damping of the oscillation mode; determining the viscosity measurement value depending on the density, the natural frequency, and the damping of the oscillation mode; wherein, according to the invention, the viscosity measurement value is determined, depending on a specification of the type of medium, with a model corresponding to the specification.

According to the invention, the determination of the viscosity using a specification of the medium therefore takes into account what type of medium it is; where applicable, the chemical composition of the medium may optionally be used for the specification thereof, wherein the model corresponding to the specification for determining the viscosity measurement value is developed using media of the same or similar chemical composition.

In a development of the invention, the identification comprises the association of the medium with a substance group, wherein the model comprises a substance group-specific model. This development simplifies the method relative to embodiments with a model development in each instance for a plurality of chemical compositions.

According to a development of the invention, the viscosity measurement values determined with a first model for a first substance group are at least 20% greater, in particular at least 40% greater, than the viscosity measurement values determined with a second model for a second substance group when the viscosity measurement values determined with the second model are no greater than 10 cP.

The first and the second model can, for example, have an identical transfer function which differs between the models only in its coefficients, but in principle different transfer functions can also be used.

According to a development of the invention, the first model and the second model in each instance have a transfer function for determining the viscosity measurement value depending on the damping and the natural frequency of the oscillation mode, as well as the density of the medium, wherein the first and the second transfer function in each instance have a basic damping term, wherein the determined damping is to be corrected with the basic damping term in order to determine a medium-specific damping value, wherein a first basic damping term for the first transfer function differs from a second basic damping term for the second transfer function.

The basic damping term describes the damping of the raw measurement oscillations for viscosities approaching zero. For a measuring sensor type, or for an individual measuring sensor, a substance group-specific basic damping value with a sufficiently low-viscosity medium from the substance group is determined for each of the transfer functions. According to the prior art, a basic damping value was determined in a substance group-dependent manner via extrapolation of viscosity-dependent damping values at low viscosities. In conjunction with studies regarding the present invention, it has been shown that this procedure is not effective at viscosities of less than approximately 10 cP. Therefore, the invention proposes to determine substance-specific or substance group-specific basic damping values.

According to a development of the invention, the first transfer function for the first model has a first sensitivity factor $A_{11}$ that deviates from a second sensitivity factor $A_{12}$ of the second transfer function for the second model, wherein the determined viscosity measurement value in each instance is proportional to the sensitivity factor.

According to a development of the invention, the determined viscosity measurement value depends on the square of the medium-specific damping value, and is in particular proportional to the square of the medium-specific damping value.

According to a development of the invention, the basic damping term has a product of a basic damping factor $A_{0i}$ and a density correction term, wherein the basic damping factor $A_{0i}$ of the first transfer function deviates from the basic damping factor of the second transfer function.

According to a development of the invention, the density correction term has a function of a deviation of the determined density of the medium from a reference density.

According to a development of the invention, the density correction term is identical for the first model and the second model.

According to a development of the invention, the substance group-specific viscosity measurement values determined with the transfer functions for viscosities between 90 cP and 110 cP deviate by no more than 10% from control viscosity measurement values which are determined with the following substance group-specific control transfer functions, wherein the substance group-specific viscosity measurement values determined with the transfer functions for viscosities between 1 cP and 90 cP deviate by no more than 50% of control viscosity measurement values which are determined with the following substance group-specific control transfer functions:

$$\eta = \frac{A_{1i}}{f^3\rho}(D - A_{0i}(1 - A_{2i}(\rho - \rho_{ref})))^2$$

wherein $A_{0i}$ is the substance group-dependent basic damping factor which differs between the first and second control transfer function, wherein $A_{1i}$ is the substance group-dependent sensitivity factor which differs between the first control transfer function and the second control transfer function, wherein $A_{2i}$ is a weighting factor to model an influence of density on the damping, wherein $\rho$ is the determined density of the medium, and $\rho_{ref}$ is a reference density, wherein D is the determined damping, and wherein f denotes the frequency of the excited bending oscillation mode.

In a development of the invention, $\rho_{ref}$ is the same for both control transfer functions.

In a development of the invention, $A_{2i}$ is the same for both control transfer functions.

According to a development of the invention, the reference density $\rho_{ref}$ is the same for both transfer functions, wherein in particular the coefficient $A_{2i}$ of the density correction term is the same for both transfer functions.

The above control functions are obviously suitable transfer functions in order to be able to calculate the sought viscosity measurement values based on the aforementioned input variables, because they represent the physical state of affairs in a comprehensible manner. Nevertheless, it is also possible to approximate the sought viscosity measurement values in the stated viscosity range with other functions with the specified accuracy. Formally different mathematical descriptions of the material-specific models according to the invention can therefore likewise be used to realize the invention.

The measuring device according to the invention for determining a viscosity measurement value of a medium comprises: a measuring sensor with an oscillatory measuring tube for conducting the medium, an exciter for exciting at least one oscillation mode of the measuring tube, and an oscillation sensor for detecting the measuring tube oscillations; and a measurement and operation circuit with a computing unit for driving the exciter and for detecting signals of the oscillation sensor; wherein, according to the invention, the measurement and operation circuit is configured to implement the method according to the invention with the measuring device.

The method according to the invention for determining a volumetric flow measurement value of a flowing medium comprises: determining a preliminary volumetric flow measurement value; determining a viscosity measurement value of the medium by means of the method according to the invention for determining a viscosity measurement value; determining a Reynolds number of the medium based on the preliminary flow measurement value, the density measurement value, and the viscosity measurement value; and determining a volumetric flow measurement value, corrected with the Reynolds number, based on the preliminary volumetric flow measurement value and the Reynolds number.

The measuring point according to the invention for determining a volumetric flow measurement value of a flowing medium by means of the method according to the invention for determining a volumetric flow measurement value comprises: a flowmeter for determining a preliminary flow volumetric measurement value, and a measuring device according to claim 12, which are functionally connected to one another in order to exchange the required data for implementing the method.

The Coriolis mass flowmeter according to the invention comprises: at least one measuring tube for conducting a medium; at least one exciter for exciting at least one oscillation mode of the measuring tube; at least two oscillation sensors for detecting measuring tube oscillations and a flow-dependent deformation of an oscillation mode; a measurement and operation circuit with a computing unit which is configured to implement the method according to the invention for determining a viscosity measurement value and a volumetric flow measurement value with the Coriolis mass flowmeter.

BRIEF DESCRIPTION OF THE DRAWINGS

The invention is now explained on the basis of the exemplary embodiments shown in the drawings. The following are shown:

FIG. 2 shows a flowchart for an exemplary embodiment of the method according to the present disclosure.

DETAILED DESCRIPTION

Figure 1:
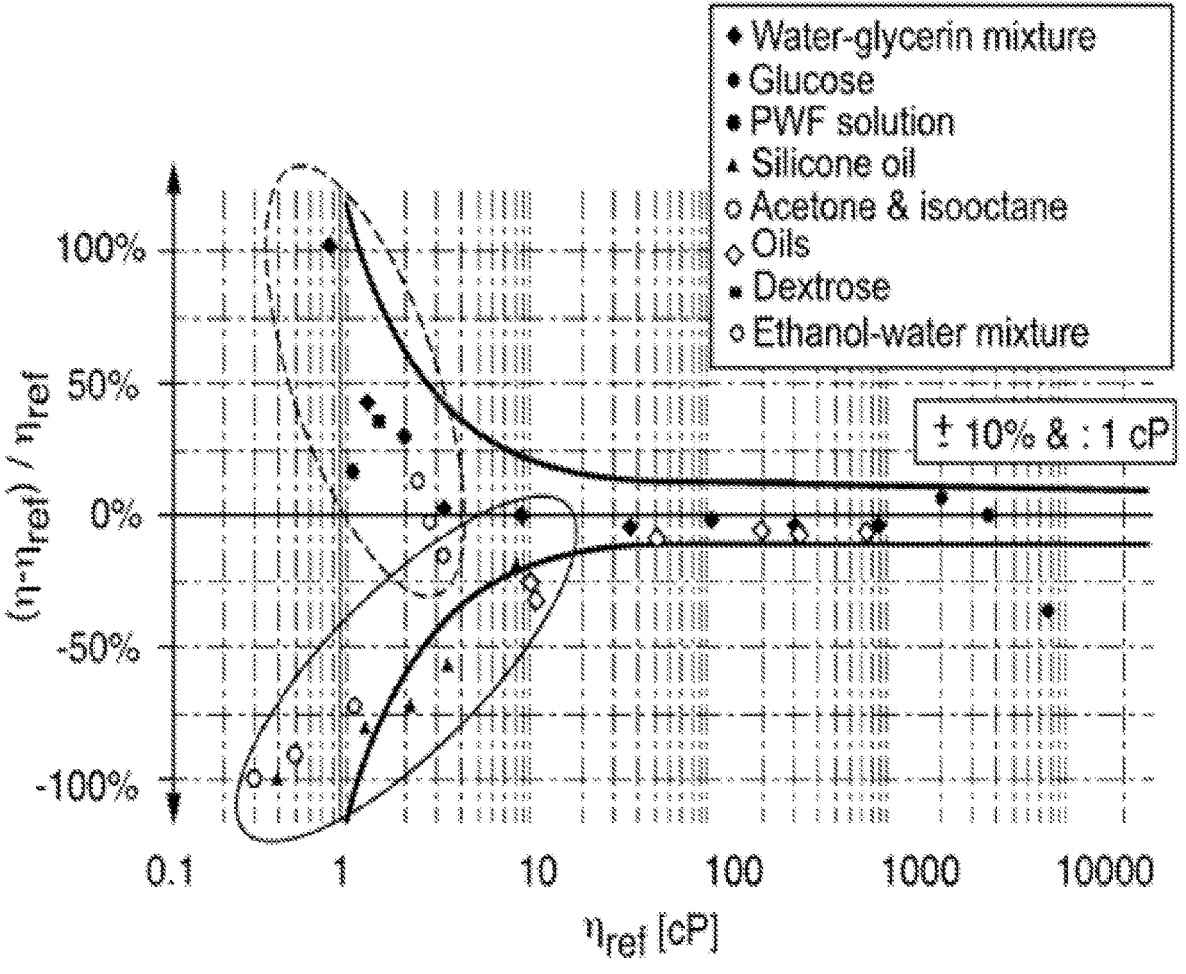
FIG. 1 shows deviations of viscosity measurement values according to the prior art from reference data, for different media.

In FIG. 1, relative deviations of viscosity measurement values determined according to the prior art for different media are plotted over the respective reference value for the viscosity of the media. The viscosity measurement values were thereby determined based on the oscillation damping of a measuring tube with a model that is independent of the medium type, according to:

$$\eta = \frac{A_1}{f^3\rho}(D - A_0(1 - A_2(\rho - \rho_{ref})))^2 \tag{I}$$

In the above equation, the medium-independent coefficients $A_1$, $A_2$, and $A_0$ describe device-specific sensitivity factor, a coefficient for a density-correction term, and a basic damping, wherein $\rho$ and $\rho_{ref}$ denote a density value of the respective medium or a reference density value of, in particular, 1000 kg/m³. The solid lines indicate relative deviations of ±10% from the respective reference value of the viscosity, including ±1 cP. The basic damping $A_0$ is hereby determined by means of regression calculation based on the observed damping values and the reference viscosities. It can hereby be seen that, with decreasing viscosity, the medium-independent basic damping for viscosities below 10 cP is too great for a first part of the media and is too small for a second part of the media.

According to the invention, it is therefore proposed to take into account the type of medium in the determination of a viscosity measurement value, for example in that a specific model for the medium or the medium type is created which describes the relationship between viscosity and damping, or in that the medium or the medium type is associated with a substance group for which a model already exists, which model describes the relationship between viscosity and damping with sufficient accuracy. For one medium type, medium type-specific coefficients $A_{1m}$, $A_{2m}$, and $A_{0m}$ can be determined for the above equation, which then are to be used for the viscosity determination, in particular at viscosities below approximately 10 cP. In the present context, a medium type is to be understood, for example, as a binary or in some cases ternary mixture, wherein the viscosity depends on the mixing ratio of the mixture components. For example, with a mixture of water and glycerin, viscosities over a range of from less than 1 cP to 1000 cP can be represented for which damping values can be determined in each instance. Based on the damping values for the mixtures and the reference values known for the mixtures, a model specific to the water-glycerin medium type can then be set up, for example by determining suitable coefficients $A_{1m}$, $A_{2m}$, and $A_{0m}$.

A further example of a medium type is substances whose viscosity can be adjusted via the molecular weight; for example, this is so with silicone oils, for which viscosity values of from less than 10 cP up to more than 10,000 cP can be achieved. The procedure for setting up a medium type-specific model for silicone oils corresponds to the procedure described above for mixtures.

Furthermore, it can be learned from the diagram in FIG. 1 that, at viscosities below 10 cP, the relative deviations of the viscosity measurement values from the reference values for the viscosity can be combined into two substance groups, as indicated by the ellipses in FIG. 1. The dashed ellipse hereby encompasses such media or medium types to form a first substance group for which, according to equation I, the viscosity measurement value based on the damping is too great with the model independent of the medium type. For this first substance group, deviations with a first substance group-specific model can be substantially reduced, in which model a larger, first substance group-specific basic damping value $A_0$, is used. Furthermore, the solid ellipse combines such media or medium types to form a second substance group for which, according to equation I, the viscosity measurement value based on the damping is too small with the model independent of the medium type. For this second substance group, deviations with a second substance group-specific model can be considerably reduced, in which model a smaller, second substance group-specific basic damping value $A_{02}$ is used. The precise substance group-specific basic damping values can be determined using the observed damping values for the media of a substance group, for example by means of regression calculation. If medium type that has not yet been classified after establishing the models is to be analyzed, it can in the simplest event be associated with one of the substance groups via a few damping measurements at low viscosities, in particular under 10 cP. The determination of viscosity measurement values based on the damping of a measuring tube oscillation with a substance group-specific model leads to a significantly improved accuracy compared to the prior art.

In measurement operation, substance group-specific models according to the invention, or the transfer functions thereof, for example in the form of $$\eta = \frac{A_{1i}}{f^3 \rho}(D - A_{0i}(1 - A_{2i}(\rho - \rho_{ref})))^2 \tag{II}$$

are used for calculating the viscosity measurement values.

The first substance group comprises, for example, the following media or medium types:

water-glycerin mixtures, dextrose, and polytungstate water solutions

The second substance group includes, for example, the following media or medium types:

ethanol-water mixtures, acetone-isooctane mixtures, and silicone oils.

To implement the method according to the invention, at least one medium type-specific model or at least one substance group-specific model, as well as information as to which model is to be applied, is provided to a computing unit of a measurement and operation circuit, which can be accomplished, for example, by inputting the type of medium, wherein the computing unit is configured to select a suitable model based on stored associations.

The implementation of an exemplary embodiment 100 of the method according to the invention is now explained using FIG. 2. The method can be implemented, for example, using a Coriolis mass flow measuring sensor, and begins with the detection of the input variables required for the viscosity determination. For this purpose, in a first step 110, the excitation of at least one oscillation mode of the measuring tube or measuring tube pair of the measuring sensor takes place; this can be, for example, a useful bending oscillation mode, or a torsion mode of a straight measuring tube. In a second step 120, a determination of a natural frequency of the oscillation mode takes place. Based on the natural frequency, determination of the density of the medium takes place in a next step 130.

Furthermore, the temperatures of a carrier tube and of the measuring tube of the measuring device enter into the determination of the density in order to calculate the temperature-dependent modulus of elasticity and to take into account thermally induced mechanical stresses.

The determination of the damping of the oscillation mode takes place in a further step 140. This results, for example, from the ratio of excitation current for maintaining the oscillation in the oscillation mode and the oscillation amplitude achieved therewith, or from the damping behavior of the oscillation amplitude after the excitation power is switched off.

Furthermore, the temperatures of the measuring tube and, where applicable of the carrier tube, of the measuring device enter into the determination of the damping in order to compensate for the temperature dependency of the efficiency of the exciter and the sensitivity of the sensors.

In a next step 150, the determination of the medium-specific damping takes place. A basic damping value is hereby subtracted from the determined damping, wherein the basic damping value is medium type-specific or substance group-specific. Finally, in a step 160, the determination of the viscosity measurement value takes place, wherein in particular the steps 150 for determining the medium-specific damping and 160 for determining the viscosity measurement value can be integrated in the evaluation of a transfer function, for example the transfer function according to equation II. In this way, the relative measurement error in the viscosity measurement is considerably reduced compared to the prior art.

The viscosity measurement value can be output or be used as an auxiliary variable for the determination of other measured variables, such as for correcting a volumetric flow measurement value depending on the Reynolds number, as described in EP 1 281 938 1 for a mass flow rate. Insofar as the present invention provides a more accurate viscosity measurement value, a more accurate Reynolds number can thus also be determined, which ultimately enables a more accurate correction of the volumetric flow measurement value.

This procedure is illustrated by optional method steps in FIG. 2, wherein the determination of a preliminary flow measurement value initially takes place with a volumetric flow measuring sensor in a first step 170. In the next step 180, the determination of the Reynolds number takes place based on the preliminary volumetric flow measurement value, the density, the viscosity measurement value, and a characteristic variable of the flow measuring sensor, for example a measuring tube diameter of the flow measuring sensor. In a last step 190, the determination of a corrected flow measurement value takes place according to the principles described in EP 1 281 938 B1.

The flow measuring sensor can be the same measuring sensor that is also used to determine the viscosity measurement value, but this is not absolutely mandatory. Similarly, the correction of a preliminary volumetric flow measurement value determined with a different measurement principle can take place, for example with an ultrasonic flow measuring sensor or a magnetic-inductive measuring sensor.

Figure 3:
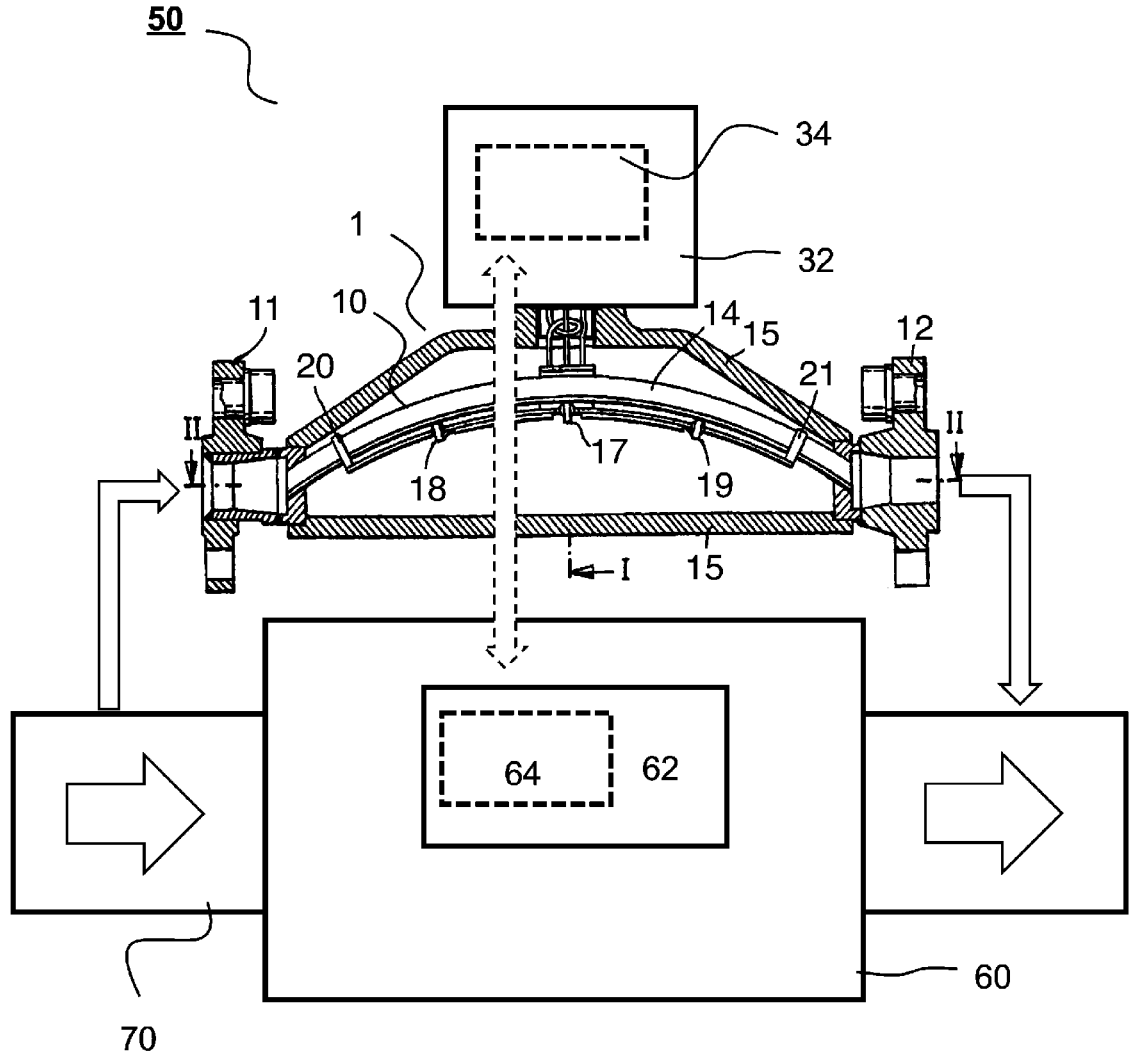
FIG. 3 shows a schematic representation of an exemplary embodiment of a measuring point according to the present disclosure.

The exemplary embodiment of a measuring point 50 according to the invention, shown in FIG. 3, comprises a Coriolis mass flow measuring sensor 1 which is designed as an exemplary embodiment of a measuring device according to the invention, i.e., it is configured to implement the method according to the invention and to determine a viscosity measurement value. The Coriolis mass flow measuring sensor 1 comprises an oscillator 10, which comprises a pair of oscillatory measuring tubes 14 guided in parallel and extending between an inlet-side flange 11 and an outlet-side flange 12, wherein the flanges in each instance comprise a flow divider or collector into which the measuring tubes 14 open. The flow dividers are connected to one another by a rigid housing 15, so that oscillations of the flow dividers accommodating the measuring tubes are effectively suppressed in the range of oscillation frequencies of useful bending oscillation modes of the oscillator. The measuring tubes 10 are rigidly connected to an inlet-side node plate 20 and an outlet-side node plate 21, wherein the node plates define oscillation nodes of the oscillator 10 formed by the two measuring tubes 14, and thus largely establish the range of possible frequencies of the useful bending oscillation modes. The oscillator 10 is excited to oscillate by an electrodynamic exciter 17 acting between the two measuring tubes 14, wherein the oscillations are detected by means of two electrodynamic oscillation sensors 18, 19 detecting relative movements of the measuring tubes 14 in relation to one another. The exciter 17 is operated by a first operation and evaluation circuit 30 with a first computing unit 32, wherein the operation and evaluation circuit is configured to implement the method according to the invention. The measuring point furthermore comprises a pipeline 70, the nominal diameter of which is a multiple of the nominal diameter of the Coriolis mass flow measuring sensor 1. The Coriolis mass flow measuring sensor is arranged in the bypass, and specifically parallel to a flowmeter 60 arranged in the pipeline, for example an ultrasonic flowmeter 60. The ultrasonic flowmeter 60 has a second operation and evaluation circuit 62 with a second computing unit 64 for operating the ultrasonic flowmeter. The second computing unit 64 is connected to the first computing unit 34 for data exchange. The second computing unit 64 is configured to determine a preliminary volumetric flow measurement value, and to provide a volumetric flow measurement value, corrected with respect to the Reynolds number, based on the values for density and viscosity provided by the first computing unit 34.

Of course, the first computing unit 34 of the Coriolis mass flow measuring sensor 1 can also be configured to provide a volumetric flow measurement value corrected with respect to the Reynolds number, whether based on a preliminary volumetric flow measurement value determined by another flowmeter or based on a preliminary volumetric flow measurement value determined with the Coriolis mass flow measuring sensor 1.

The invention claimed is:

1. A method for determining a viscosity measurement value of a medium conducted within an oscillatory measuring tube, the method comprising:

exciting at least one oscillation mode of the oscillatory measuring tube;

determining a natural frequency of the at least one oscillation mode;

determining a density of the medium;

determining a damping of the at least one oscillation mode; and determining the viscosity measurement value depending on the density, the natural frequency, and the damping of the at least one oscillation mode;

wherein the viscosity measurement value is determined depending on a specification of a type of the medium with a model corresponding to the specification;

wherein the specification includes the association of the medium with a substance group, and wherein the model includes a substance group-specific model.

2. The method according to claim 1, wherein a viscosity measurement value determined with a first model for a first substance group is at least 20% greater than a viscosity measurement value determined with a second model for a second substance group, when the viscosity measurement value determined with the second model is no more than 10 cP.

3. The method according to claim 2, wherein the first model and the second model in each instance have a transfer function, wherein the first and the second transfer function in each instance have a basic damping term, wherein the determined damping is to be corrected with the basic damping term in order to determine a medium-specific damping value, wherein a first basic damping term for the first transfer function differs from a second basic damping term for the second transfer function.

4. The method according to claim 3, wherein the first transfer function for the first model has a first sensitivity factor that deviates from a second sensitivity factor of the second transfer function for the second model, wherein the determined viscosity measurement value is in each instance proportional to the sensitivity factor.

5. The method according to claim 4, wherein the determined viscosity measurement value depends on the square of the medium-specific damping value, and is proportional to the square of the medium-specific damping value.

6. The method according to claim 5, wherein the basic damping term has a product of a basic damping factor and a density correction term, wherein the basic damping factor of the first transfer function deviates from the basic damping factor of the second transfer function.

7. The method according to claim 6, wherein the density correction term has a function of a deviation of the determined density of the medium from a reference density.

8. The method according to claim 7, wherein the density correction term is identical for both models.

9. The method according to claim 8, wherein the substance group-specific viscosity measurements determined with the transfer functions deviate, for viscosities between 90 cP and 110 cP, by no more than 10% from control viscosity measurement values determined with the following substance group-specific control transfer functions, and wherein the substance group-specific viscosity measurements determined with the transfer functions deviate, for viscosities between 1 cP and 90 cP, by no more than 50% from control viscosity measurement values determined with the following substance group-specific control transfer functions:

$$\eta = \frac{A_{1i}}{f^3\rho}(D - A_{0i}(1 - A_{2i}(\rho - \rho_{ref})))^2$$

wherein $A_{0i}$ is the substance group-dependent basic damping factor which differs between the first and second control transfer functions,
wherein $A_{1i}$ is the substance group-dependent sensitivity factor which differs between the first control transfer function and the second control transfer function,
wherein $A_{2i}$ is a weighting factor to model an influence of density on the damping, wherein $\rho$ is the determined density of the medium, and $\rho_{ref}$ is a reference density,
wherein D is the determined damping, and
wherein f denotes the frequency of the excited bending oscillation mode.

10. The method according to claim 9, wherein $\rho_{ref}$ is the same for both control transfer functions.

11. The method according to claim 10, wherein $A_{2i}$ is the same for both control transfer functions.

12. A measuring device for determining a viscosity measurement value of a medium, comprising:
a measuring sensor, including:
an oscillatory measuring tube for conducting the medium;
an exciter for exciting at least one oscillation mode of the oscillatory measuring tube; and
an oscillation sensor for detecting oscillatory measuring tube oscillations; and
a measurement and operation circuit, including:
a computing unit for driving the exciter and for detecting signals of the oscillation sensor, wherein the measurement and operation circuit is configured to:
excite the at least one oscillation mode of the oscillatory measuring tube;
determine a natural frequency of the at least one oscillation mode;
determine a density of the medium;
determine a damping of the at least one oscillation mode; and
determine the viscosity measurement value depending on the density, the natural frequency, and the damping of the at least one oscillation mode;
wherein the viscosity measurement value is determined depending on a specification of a type of the medium with a model corresponding to the specification;
wherein the specification includes the association of the medium with a substance group, and wherein the model includes a substance group-specific model.

13. A method for determining a volumetric flow measurement value of a flowing medium, comprising:
determining a preliminary volumetric flow measurement value;
determining a viscosity measurement value of the medium, including:
exciting at least one oscillation mode of an oscillatory measuring tube;
determining a natural frequency of the at least one oscillation mode;
determining a density of the medium;
determining a damping of the at least one oscillation mode; and
determining the viscosity measurement value depending on the density, the natural frequency, and the damping of the at least one oscillation mode,
wherein the viscosity measurement value is determined depending on a specification of a type of the medium with a model corresponding to the specification;
wherein the specification includes the association of the medium with a substance group, and wherein the model includes a substance group-specific model;
determining a Reynolds number of the medium based on the preliminary volumetric flow measurement value, the density measurement value, and the viscosity measurement value; and
determining a volumetric flow measurement value, corrected with the Reynolds number, based on the preliminary volumetric flow measurement value and the Reynolds number.

14. A measuring point for determining a volumetric flow measurement value of a flowing medium, comprising:
a flowmeter for determining a preliminary volumetric flow measurement value; and
a measuring device, including:
a measuring sensor, including:
an oscillatory measuring tube for conducting the medium;
an exciter for exciting at least one oscillation mode of the oscillatory measuring tube; and
an oscillation sensor for detecting oscillatory measuring tube oscillations; and
a measurement and operation circuit, including:
a computing unit for driving the exciter and for detecting signals of the oscillation sensor,
wherein the measurement and operation circuit is configured to:
excite the at least one oscillation mode of the oscillatory measuring tube;

determine a natural frequency of the at least one oscillation mode;

determine a density of the medium;

determine a damping of the at least one oscillation mode; and determine the viscosity measurement value depending on the density, the natural frequency, and the damping of the at least one oscillation mode, wherein the viscosity measurement value is determined depending on a specification of a type of the medium with a model corresponding to the specification, wherein the specification includes the association of the medium with a substance group, and wherein the model includes a substance group-specific model;

wherein the flowmeter is configured to:

determine the preliminary volumetric flow measurement value;

determine a Reynolds number of the medium based on the preliminary volumetric flow measurement value, the density measurement value, and the viscosity measurement value; and determine the volumetric flow measurement value, corrected with the Reynolds number, based on the preliminary volumetric flow measurement value and the Reynolds number.

15. A Coriolis mass flowmeter, comprising:

at least one measuring tube for conducting a medium;

at least one exciter for exciting at least one oscillation mode of the at least one measuring tube;

at least two oscillation sensors for detecting measuring tube oscillations and a flow-dependent deformation of the at least one oscillation mode;

a measurement and operation circuit including a computing unit configured to:

excite the at least one oscillation mode of the at least one measuring tube;

determine a natural frequency of the at least one oscillation mode;

determine a density of the medium;

determine a damping of the at least one oscillation mode; and determine the viscosity measurement value depending on the density, the natural frequency, and the damping of the at least one oscillation mode, wherein the viscosity measurement value is determined depending on a specification of a type of the medium with a model corresponding to the specification, wherein the specification includes the association of the medium with a substance group, and wherein the model includes a substance group-specific model.

* * * * *